United States Patent
Jones, Jr.

[11] Patent Number: 5,261,445
[45] Date of Patent: Nov. 16, 1993

[54] VALVE LOCK

[76] Inventor: Edward Jones, Jr., 6205 Brookhill #3, Houston, Tex. 77087

[21] Appl. No.: 5,785

[22] Filed: Jan. 19, 1993

[51] Int. Cl.⁵ ............................................. F16K 35/00
[52] U.S. Cl. ...................................... 137/382; 251/90; 70/177; 70/179; 70/185
[58] Field of Search ........................ 137/382, 383, 385; 70/176, 177, 178, 179, 180, 183, 184, 185, 186; 251/90

[56] References Cited

U.S. PATENT DOCUMENTS 2,364,909 12/1944 Murphy ................................. 70/179
4,377,178 3/1983 Thompson ............................ 137/385
4,709,720 12/1987 Russo ................................... 137/385

Primary Examiner—Martin P. Schwadron
Assistant Examiner—Kevin L. Lee
Attorney, Agent, or Firm—Donald H. Fidler

[57] ABSTRACT

A valve lock for valves wherein the valve stem is coupled to a valve actuator shaft and there is a spacing between the valve and valve actuator. A locking member is slidably receivable in the spacing and fixed against rotation so that a locking slot in the locking member engages a locking segment of the interconnected valve stem and valve actuator shaft. The locking member, in turn, can be releasably locked to prevent unauthorized or unintended use of the valve.

10 Claims, 1 Drawing Sheet

VALVE LOCK

FIELD OF THE INVENTION

This invention relates to apparatus for securing or locking a valve in an open or closed position, and more particularly, to a locking system which does not require extensive modification to existing valve systems to achieve a locking result in a simple and efficient manner.

BACKGROUND OF THE INVENTION

Valves in pipeline or flow conduits are commonly used to control fluid flow through a conduit and can include a rotatable valve element in a valve body where the valve element can be rotated between positions of open and closed conditions of the valve and typically involve a ninety degree rotation of a valve stem. In some circumstances the valve element is rotated through 180° or 270°. The valve stem is rotated through the ninety degrees (or other angle) by a valve actuator which can be hydraulic, pneumatic, mechanical, manual or the like to rotate the valve between its open and closed position. The valve actuator can be locally or remote controlled.

The valve actuator and the valve are respectively bolted to a support base member. A typical support base member has a hollow interior in the form of a rectangular cross-section. The valve actuator typically has a square, or non-circular shaped, actuator shaft extending into the hollow interior. Similarly, the valve has a square, or non-circular shaped, valve stem shaft extending into the hollow interior. The actuator and valve stem shafts are axially aligned. A coupling device or sub with square shaped socket ends is used to connect the valve actuator shaft to the valve stem shaft so that rotation of the valve actuator shaft is transmitted to the valve stem shaft to move the valve stem between the open and closed positions. In other instances, the support base member can be a solid plate with a hole for the shafts and coupling member. Other types of support will be known to those skilled in the art.

In many instances, by governmental regulation and otherwise, it is desirable to provide security in the form of a locking mechanism to lock a valve in either an open or closed position which prevents unauthorized and unintended operation of the valve. Heretofore, with the apparatus as described above, the system for locking has involved the drilling of a bore through the coupling member and through the support base member and utilizing a rod type locking member which must be aligned precisely with the bores for locking purposes. This type of system is an expensive and awkward type of modification and involves particular alignment problems which do not make it readily advantageous to utilize.

SUMMARY OF THE INVENTION

The present invention concerns itself with a simple and inexpensive modification to existing valve and valve actuator systems which can be easily performed subsequent to installation or obtained with the purchase of a valve. The system is simple and straightforward in its application to lock valve actuators or valve stems having non-circular cross-sections in a given position.

In the present invention, either the actuator body or the valve body is displaced relative to the intermediate supporting base member by spacer members which may be elongated guide shim members. The shim members are located between a valve body and the supporting base member or between an actuator body and the supporting base member. The shim members are located on either side of the common axis for the aligned actuator and valve shafts and provide a specific spacing or gap between the support base housing and a valve body or an actuator body. The shim members are arranged relative to one another so that an elongated locking member can be guided between the shims members where the locking member has a longitudinal axis which is aligned relative to the axis for the shim members. The shaft portion in the gap has a non-circular locking surface in a plane normal to a radius of the shaft portion. The locking member is a plate member with a slot in one end where the slot has a locking surface arranged to engage the locking surface on the shaft portion. Thus, the shaft is locked and prevented from rotation by engagement with the locking surfaces. The locking member and the support base member also are provided with aligned openings which can receive a lock for security purposes.

In a preferred form of the invention, the guiding shims are rectangular, elongated members which are disposed parallel to on another with facing parallel surfaces parallel and parallel surfaces on a square shaped shaft portion. The locking surfaces of the shaft portion are thus spaced an equal distance from the inner parallel surfaces of the guiding shim members in both the open and closed position of a valve. The locking member is an elongated rectangular member with an elongated square shaped slot sized to be received over the square shape of the shaft portion so that the shaft is prevented from rotation. The aligned openings are located exteriorly of the valve body and valve actuator and are provided for locking means to lock the locking member to the base support.

In a more involved configuration, the shaft portion can be rectangular to utilize different sized slots for the respective open and closed positions of the valve.

The present invention thus involves the additional components of rectangular shaped shim members and a locking member with a hole to receive a lock device to adapt to existing types of valve operations. Thus, it is extremely simple to retrofit existing applications and inexpensive and simple to apply to new applications where valve locking is desired.

DESCRIPTION OF THE PRESENT INVENTION

Figure 1:
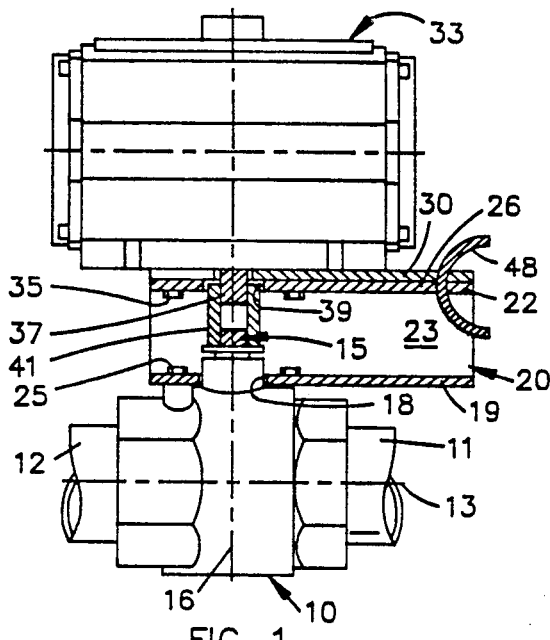
FIG. 1 is a side view of a valve actuator and valve with the support member and locking member partially shown in cross-section.
Figure 2:
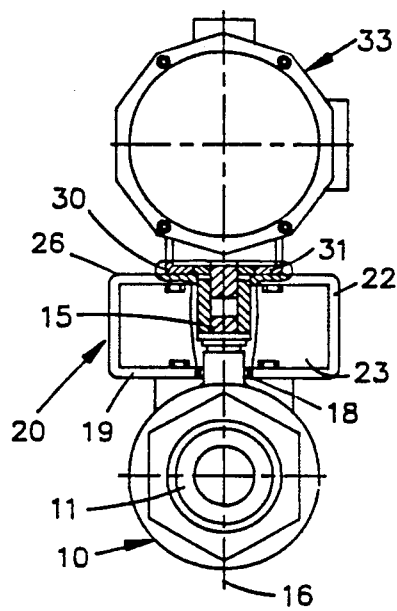
FIG. 2 is an end view of FIG. 1 and showing part of the locking system in cross-section.

Referring now to FIGS. 1 and 2, a conventional valve 10 has an inlet 11, and an outlet 12 disposed along a longitudinal axis 13. A central valve element (not shown) is controlled by a valve stem shaft 15 which extends along a transverse axis 16. The shaft 15 has a terminal portion with a non-circular cross-section (typically a square or rectangular shape).

The bonnet of the valve 10 extends through an opening 18 in a lower wall section 19 of a base member 20. The base member 20 in the form illustrated is elongated in the direction of the longitudinal axis 13 and has a generally rectangular cross-section with a rectangularly formed wall 22 defining a rectangular opening 23. The lower wall section 19 is attached to the valve 10 by bolts 25 which threadedly couple to the valve 10.

On the upper wall section 26 of the base member are spaced apart shim members 30 and 31. The shim members 30 and 31 are bar members with a rectangular configuration. The shim members 30, 31 are illustrated as disposed between the upper surface on the wall section 26 of the base member 20 and a lower base surface on a conventional valve actuator 33. Bolts 35 extend through the upper wall section 26, and the shim members 30 and 31 to attach the valve actuator 33 to the base member 20. The shim members 30 and 31 define parallel guide surfaces to receive a locking member 40 as hereafter described. It will be appreciated that in some instances non-parallel guide surfaces can be used to receive triangularly shaped locking member.

The valve actuator 33 is a conventional pressure operated actuator which can be obtained from El-O-Matic in Hackensack, N.J. The valve actuator 33 has a transverse actuator shaft 37 which is aligned with the transverse axis 16 and the valve stem shaft 15. The cross-section of the terminal end portion of the shaft 37 is square and the shaft 37 extends through an opening 39 in the upper wall section 26. A tubular coupling 41 with square shaped sockets interconnect the shafts 15 and 37. While square shaped shafts are described, non-circular shafts can be utilized on the valve shaft, the actuation shaft or the coupling member.

In operation of the valve, pneumatic pressure actuates the valve actuator 33 to rotate the coupled shafts 37 and 15 through a ninety degree angle (or the angle required to operate the valve) to open or to close the valve depending upon which angular position the valve stem is in. In each of the ninety degree positions of the actuator shaft, the flat surfaces of the shaft face the edge or side surfaces of the shim members 30 and 31 in a parallel relationship to one another. The pressure actuator may, of course be a hydraulic or electrically operated actuator, if desired.

As viewed from the side, (see FIG. 2) a width dimension is defined between the upper wall section 26 of the base member 20 and the lower wall section 19 of the base member 20. A length dimension is defined between the edge or side surfaces of the shim members 30, 31. The length dimension extends to either side of the axis 16. The width and length dimensions define a rectangular cross-sectional opening and the square portion of the shaft extends across the width dimension.

Figure 3:
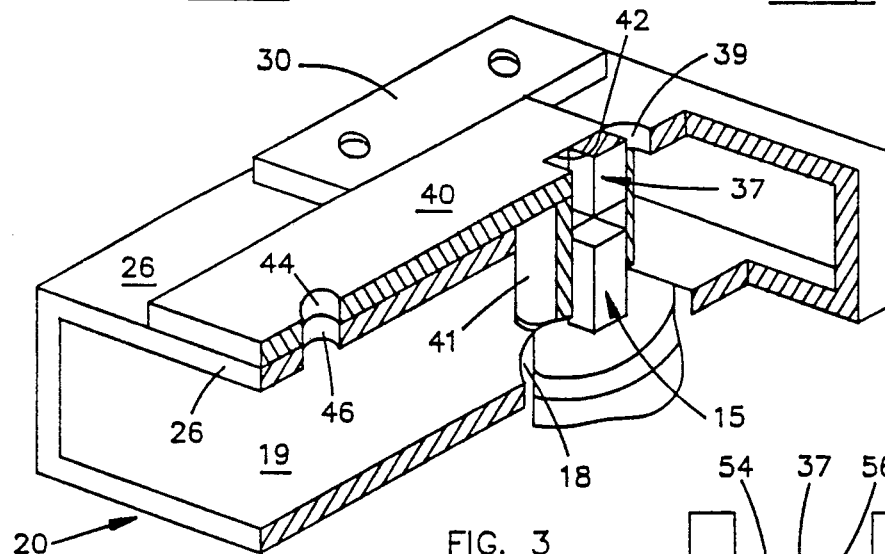
FIG. 3 is a view in perspective and in partial cross-section to illustrate the features of the present invention.

A locking member 40 is in the form of a rectangular bar in the form of the invention illustrated. The rectangular bar member 40 is sized to be slidably received in the cross-sectional opening so that its side surfaces are closely adjacent to the side surfaces of the shim members 30 and 31. The locking member 40 has a slot 42 in one end which can slidably receive the square portion of the shaft as shown in FIG. 3 with the locking member in a locking position providing locking side surfaces which prevent rotation of the shaft. If the shaft has another non-circular shape (other than square) the slot 42 is configured to lock with the non-circular shape of the shaft. In a locking position, the locking member 40 has an opening 44 which is aligned with an opening 46 in the upper wall section 26 of the base member 20. A conventional combination or key lock device 48 (partially shown) can be used to prevent release of the valve portion until the lock device is removed.

Figure 4:
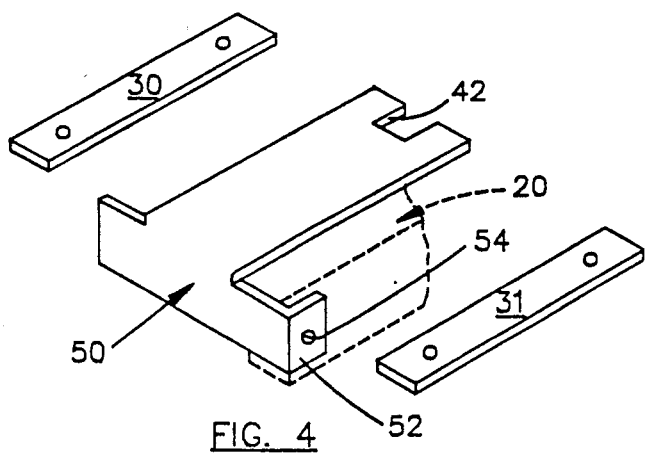
FIG. 4 is an illustration in an exploded view of another form of the locking mechanism as it might be applied to a valve system.

As shown in FIG. 4, the locking member 50 can assume other shapes to include a downwardly extending section with an angular tab 52 and openings 54 for a lock in the side wall of the base member 20. The shim members 30 and 31 associated with the locking member are alignable with the side edge surfaces of the locking member 50.

Figure 5:
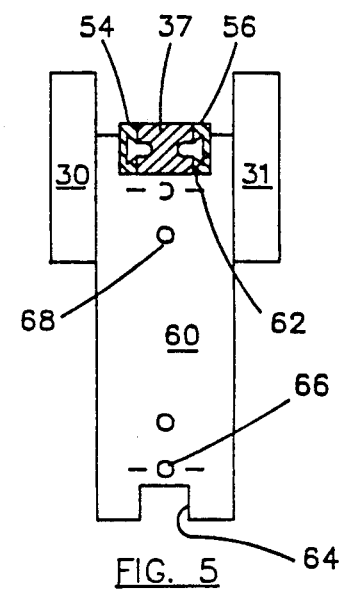
FIG. 5 is a plan view of a modification of the present invention.

Referring now to FIG. 5, another form of the invention is illustrated where the shaft 37 is provided with attached elements 54, 56 to define a rectangular cross-section. The locking member 60 has one end with a slot 62 sized to lock with the long dimension of the cross-section and an opposite end with a slot 64 sized to lock with the short dimension of the cross-section. Marking indicia such as "o" and "c" for "open" and "closed" can be used so that the locking member can be used to indicate the valve position. Openings 66 and 68 are located equal distances from the end of the locking member and provide for alignment with an opening in the base member for a lock device.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. A valve locking system for locking a valve means located in a flow conduit in an open or closed position where the valve means has a valve stem shaft coupled to a valve actuator shaft in a valve actuator means by coupling means and one of said valve means and said valve actuator has a shaft with a non-circular cross section and with a locking flat surface disposed normal to a radial axis for said shaft and where the valve actuator means and valve means are connected to a support base member with the coupling means extending through said support base member, said locking system including:

elongated shim members disposed between said support base member and said one of said valve means and said valve actuator means for defining a width spacing and for slidably receiving a locking member and for defining facing surfaces with a transverse length spacing which extends to either side of said shaft, said width spacing and said length spacing defining a cross sectional area;

said locking member being elongated and sized in cross-section for sliding reception in the cross-sectional area defined by said width spacing and said length spacing, said locking member having a slot in one end where said slot has a locking flat surface for complementary engagement with said locking flat surface on said shaft with a non-circular cross-section for locking said shaft against rotation; and said locking member and said support base member having aligned opening when said locking flat surfaces are in engagement where said aligned openings are sized to receive a locking means to prevent movement of said locking member relative to said support base member.

2. The locking system as set forth in claim 1 wherein said cross-sectional area is located between said valve actuator means and said base support member.

3. The locking system as set forth in claim 2 wherein said non-circular cross-section of said shaft is square.

4. The locking system as set forth in claim 3 wherein said facing surfaces on said shim members are parallel to one another.

5. The locking system as set forth in claim 2 wherein the shaft has a rectangular cross section with a long and a short dimension and said locking member has a first slot at one end sized to receive the long dimension of said shaft and has a second slot at the opposite end sized to receive the short dimension of said shaft.

6. A valve locking system for locking a valve means located in a flow conduit in an open or closed position where the valve means has a valve stem shaft coupled to a valve actuator shaft in a valve actuator means by coupling means and one of said valve means and said valve actuator means has a shaft with a non-circular cross section and with a locking flat surface disposed normal to a radial axis for said shaft and where the valve actuator means and valve means are connected to a support base member with the coupling means extending through said support base member, said locking system including:

shim members disposed between said support base member and said one of said valve means and said valve actuator means for defining a width spacing and for slidably receiving a locking member and for defining facing surfaces with a transverse length spacing which extends to either side of said shaft, said width spacing and said length spacing defining a cross sectional area; and said locking member being sized in cross-section for sliding reception in the cross-sectional area defined by said width spacing and said length spacing, said locking member having a slot in one end where said slot has a locking flat surface for complementary engagement with said locking flat surface on said shaft with a non-circular cross-section for locking said shaft against rotation.

7. The locking system in claim 6 wherein said cross-sectional area is located between said valve actuator means and said base support member.

8. The locking system as set forth in claim 7 wherein said non-circular cross-section of said shaft is square.

9. The locking system as set forth in claim 8 wherein facing surfaces on said shim members are parallel to one another.

10. The locking system as set forth in claim 7 wherein the shaft has a rectangular cross-section with a long and a short dimension and said locking member has a first slot at one end sized to receive the long dimension of said shaft and has a second slot at the opposite end sized to receive the short dimension of said shaft.

* * * * *